(12) United States Patent
Kuerschner et al.

(10) Patent No.: US 7,904,470 B2
(45) Date of Patent: Mar. 8, 2011

(54) DISCOVERY SERVICE FOR ELECTRONIC DATA ENVIRONMENT

(75) Inventors: Chris Kuerschner, St. Gallen (CH);
Oliver Kasten, Uerikon (CH); Ulrich Eisert, Sirnach (CH); Cosmin Condea, St. Gallen (CH)

(73) Assignee: SAP AG, Walldorf (DE)

( * ) Notice: Subject to any disclaimer, the term of this patent is extended or adjusted under 35 U.S.C. 154(b) by 921 days.

(21) Appl. No.: 11/818,553

(22) Filed: Jun. 13, 2007

(65) Prior Publication Data

US 2008/0313148 A1 Dec. 18, 2008

(51) Int. Cl.
*G06F 17/30* (2006.01)
*G06F 17/40* (2006.01)

(52) U.S. Cl. .................. 707/770; 707/785
(58) Field of Classification Search ........... 707/999.003, 707/E17.008, 770, 785
See application file for complete search history.

(56) References Cited

U.S. PATENT DOCUMENTS

| | | | |
|---|---|---|---|
| 6,490,615 B1 | 12/2002 | Dias et al. | |
| 6,901,304 B2 | 5/2005 | Swan et al. | |
| 7,107,285 B2 | 9/2006 | von Kaenel et al. | |
| 7,136,832 B2 | 11/2006 | Li et al. | |
| 2002/0174236 A1* | 11/2002 | Mathur et al. | 709/229 |
| 2004/0245332 A1 | 12/2004 | Silverbrook | |
| 2005/0182825 A1* | 8/2005 | Eytchison | 709/217 |
| 2005/0234873 A1* | 10/2005 | Milligan et al. | 707/3 |
| 2006/0053234 A1 | 3/2006 | Kumar | |
| 2006/0163338 A1 | 7/2006 | Allen et al. | |
| 2006/0250248 A1 | 11/2006 | Tu et al. | |
| 2008/0157933 A1* | 7/2008 | Winkler | 340/10.6 |
| 2010/0069052 A1* | 3/2010 | Ahomaki et al. | 455/414.3 |

OTHER PUBLICATIONS

"European Application Serial No. 08010432.6, Office Action mailed Jul. 30, 2009", 9 pgs.
Adebayo, Omotunde, et al., "A Performance Study of Client-Broker-Server Systems", *Proceedings of the conference of the Centre for Advanced Studies on Collaborative research*, (1997), 16 pgs.
Agrawal, R., et al., "Towards Traceability across Sovereign, Distributed RFID Databases", *Database Engineering and Applications Symposium, 2006. Ideas 2006. 10th International, IEEE*, (Dec. 1, 2006), 174-184 pgs.
Beier, S., et al., "Discovery Series—Enabling RFID Traceability in EPCglobal Networks", http://www.almaden.ibm.com/cs/projects/lis/hdb/publications/papers/comad2006.pdf, International Conference of Management of Data Comad, (Dec. 16, 2006), 04 pgs.

(Continued)

*Primary Examiner* — James Trujillo
*Assistant Examiner* — Soheila Davanlou
(74) *Attorney, Agent, or Firm* — Schwegman, Lundberg & Woessner, P.A.

(57) ABSTRACT

A method includes storing, at a discovery service, address information for each of a plurality of information services providers. For each of the plurality of information services, product data of a respective information provider and access right data (defining access rights to the product data) are also stored. At the discovery service, a query is received from an information requester, the query being related to specific product data for a product identifier included in the query. A first information service, of the plurality of information services, is identified as an information provider of the specific product data, and first address information for the first information service is retrieved. The query is routed from the discovery service to the first information service using the first address information. The first information service selectively responds directly to the information requester in accordance with the access right data of the first information service.

19 Claims, 5 Drawing Sheets

OTHER PUBLICATIONS

"International Application Serial No. 08010432.6-2212, Extended European Search Report mailed Oct. 23, 2008", 11 pgs.

"EPCglobal", (2005),1-53.

"The EPCglobal Network(TM): overview of design, benefits, & security", *EPCglobal, Inc.*, (Sep. 24, 2004),1-11.

Bailey, J, et al., "Development of a tool for measuring and analyzing user satisfaction.", Management Science 29 (5), (1983),530-545.

Czerwinski, Stephen E., et al., "An Architecture for a secure service discovery service", *Proceedings of the 5th annual ACM/IEEE international conference on mobile computing and networking MobiCom '99*, (Aug. 1999),24-35.

Davenport, Thomas H., et al., "Information Politics", *Sloan Management Review*, 34(1), (Fall 1992),53-65.

Delone, William H., et al., "Information systems success: the quest for the dependent variable", *Information Systems Research*, 3(1), (Mar. 1992),60-95.

Fisher, Marshall L., et al., "Making supply meet demand", *Harvard Business Review*, (May-Jun. 1994),83-93.

Lee, Young M., et al., "Exploring the impact of RFID on supply chain dynamics", *Proceedings of the 2004 Winter Simulatiion Conference*, Ingalls et al., editors, (2004),1145-1152.

Lee, Hau L., et al., "The bullwhip effect in supply chains", *Sloan Management Review*, (Spring 1997).

Maes, Pattie, et al., "Agents that buy and sell", *Communications of the ACM*, 42(3), (Mar. 1999),81-91.

Markus, M. L., "Power, politics and MIS implementation", *Communications of the ACM*, 26(6), (Jun. 1983),430-44.

Mockapetris, Paul V., et al., "Development of the domain name system", *Computer Communication Review*, 11 pgs.

Olson, Margrethe H., et al., "The measurement of user information satisfaction", *Communications of the ACM*, 26(10), (Oct. 1983),785-93.

Rangaswamy, Arvind, et al., "Using computers to realize joint gains in negotiations: toward an electronic bargaining table", *Management Science*, 43(8), (Aug. 1997),1147-63.

Roduner, C., et al., "Towards an Enterprise Location Service", *Proceedings of the International Symposium on Applications on Internet Workshops (SAINT Workshops)*, (2006),4 pgs.

Roussos, George, et al., "A case study in pervasive retail", *Proceedings of the 2nd international workshop on Mobile commerce*, (2002),90-94.

Tully, Shawn, et al., "You'll never guess who really makes . . . ", *Fortune*, (Oct. 3, 1994).

Van Alstyne, Marshall, et al., "Why not one big database?", *Decision Support Systems*, 15, (1995),267-84.

Wang, Richard Y., et al., "Data quality requirements analysis and modeling", *Ninth International Conference on Data Engineering, IEEE Computer Society*, (Apr. 1993),670-677.

Zeng, Dajun, et al., "Benefits of learning in negotiation", *American Association of Artificial Intelligence*, (1997),1-6.

\* cited by examiner

DISCOVERY SERVICE FOR ELECTRONIC DATA ENVIRONMENT

TECHNICAL FIELD

Example embodiments relate to methods and systems to perform service or resource discovery within an electronic data processing environment.

BACKGROUND

Discovery services find use in a wide range of applications and environments. For example, discovery services may be used to locate printers in a network, websites or web services that have been made publicly available. However, in certain networks (e.g., in an Electronic Product Code (EPC) network of companies) it may be desirable to provide some degree of anonymity and authentication for various business reasons.

Competition in marketplaces may be very strong. Hence, companies are increasingly putting effort into reducing inefficiencies present in their supply chains (e.g., incorrect ordering and deliveries, low levels of shelf availability and inventory inaccuracies). However, the relevant information which may be used to address these inefficiencies is typically distributed among partners within a supply chain. The provision of access to this distributed information presents a number of technical challenges that need to be addressed in order to provide effective and efficient matching of supply and demand.

Although tight collaboration may present mutual benefits to supply chain partners, a number of technical issues may present hurdles to such collaboration. For example, in today's complex and dynamic supply chains, each company within a supply chain network may have only partial knowledge of the participation of other companies. Hence, retrieving complete information regarding a flow of goods through the network requires a high degree of effort in order to locate actors, and a technical backbone to support such retrieval of information. Further, even if a company is able to locate all relevant supply chain participants, there may be a lack of sufficient security and confidentiality controls in order to incentivize and encourage the participants to share sensitive operational data.

One initiative that attempts to address some of the issues described above is the EPCglobal Network. The EPCglobal Network, and other similar initiatives, attempt to enable an interested party to find data related to a specific item or service (e.g., a specific EPC number) and to request access to this data. This infrastructure uses radio frequency identification (RFID) technology, and leverages the Internet to access large amounts of information associated with Electronic Product Codes (EPCs). A component of the EPCglobal Network is a discovery service, which is a suite of services to enable supply chain participants to find EPC-related data and to request access to that data via an EPC Information Service (EPCIS). A business application may, for example, use the discovery service of an EPCglobal Network to locate EPCIS services of all EPCglobal subscribers that have information about a certain object, including EPCglobal subscribers other than the EPC manager of that object (i.e. the enterprise that issued a given EPC). Accordingly, an EPCglobal Network discovery service finds particular application in multi-party supply chains, where all participants are not known to a particular EPCIS and when it is not possible or it is impractical to "follow the chain" step by step.

Certainly, the technical challenges that are currently being faced by EPCglobal Network, specifically with respect to discovery services, are common to discovery services in other environments and applications.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

An example embodiment is described herein within the context of an EPCglobal Network, which provides an example of an electronic data environment within which a discovery service may be deployed. However, it will be appreciated that the described technology may be deployed in any electronic data environment, and is not limited to the EPCglobal Network, a product or service data environment, or a supply chain network, and may find application in a wide variety of data environments.

In one example embodiment, a method and system for a discovery service are described in which each participating entity (e.g., a company) defines access rights at an information supply level (e.g., an EPCIS level), but does not duplicate the definition of these access rights at a discovery service level. Accordingly, the discovery service maintains a list of data items (e.g., a list of products and services identified by EPCs) and the addresses of information providers associated with each product or service (e.g., related EPCIS addresses). The discovery service then operates to route queries, received from information requesters. For example, when a company requests additional information for a specific EPC from a supply chain network, the discovery service looks up related EPCIS addresses, and may then forward the complete query to identified EPCISs. At the information provider level (e.g., the EPCIS level), fine-grained access rights are stored and checked. If access is granted, the initial query, from an information requestor, is answered directly to the information requester. Accordingly, the granted access (e.g., by way of a return of data) bypasses the discovery service.

The discovery service, according to the example embodiment, does not reveal any information to an information requester regarding an information provider (e.g., an EPCIS), but merely routes the initial query to one or more identified information providers.

In the example embodiment, data (e.g., product data) and related access rights are stored and maintained by respective information providers. By avoiding the duplication of such data between an information provider and a discovery service, the example embodiment addresses concerns that information providers may have regarding the publication of their data to a third party and also regarding the exercising of control with respect to access to that data. Moreover, by avoiding the duplication of data between an information provider and a discovery service, maintenance (e.g., synchronization) challenges are minimized. This in turn lowers the threshold for entities to participate in an electronic data environment, such as the EPCglobal Network, as information providers are able to retain a greater degree of control over sensitive data. Further, as data is not necessarily distributed within an electronic data environment (e.g., a supply chain network using the EPCglobal Network), an initial EPCIS query defined in terms of the EPCIS interface specification may be used. Accordingly, no additional logic is required to define what sources should be used when answering a query.

Figure 1:
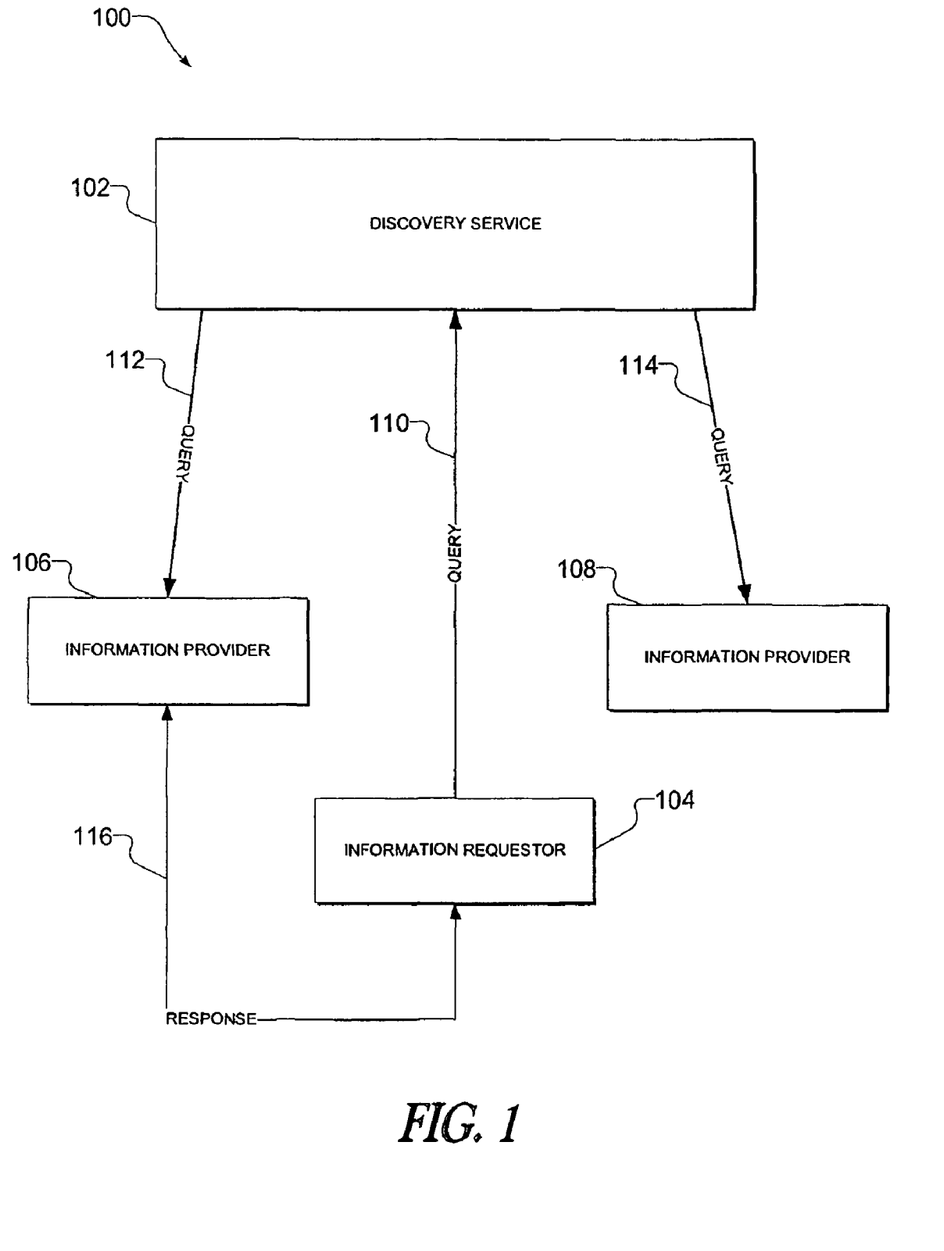
FIG. 1 is a diagrammatic representation of an electronic data environment (e.g., EPCglobal Network) that provides a discovery service, according to an example embodiment.

FIG. 1 is a block diagram illustrating an electronic data environment 100, which in one example embodiment may implement an EPCglobal Network. The data environment 100 includes a discovery service 102, which includes a suite or collection of services to enable an information requester 104 to locate and access data published by one or more information providers 106 and 108 within the electronic data environment. The information requester 104 and the information providers 106, 108 may form part of a common supply chain. At a higher level, an information requester 104 may communicate 110 a query, identifying requested data (e.g., supply chain information for a specific EPC number) to the discovery service 102. Further details regarding an example query are discussed below with reference to FIG. 3. The discovery service 102 then operates to identify relevant and qualified information providers (e.g., by performing a lookup utilizing an EPC to identify EPCIS addresses). The discovery service 102 then forwards 112, 114 the query to each of the relevant and qualified information providers 106 and 108.

Each of the information providers 106, 108 that receives the forwarded query then performs a check against locally stored access rights. As shown in FIG. 1, assuming the query satisfies the access rights, one or more information providers (e.g., information provider 106) may provide 116 a response directly to the information requester 104, the provision 114 of the response bypassing discovery service 102. The provision of the response may include transmitting data requested in the query from the information provider 106 to the information requester 104, or authorizing the information requester 104 to access information (e.g., on a restricted basis) at the information provider 106.

Figure 2:
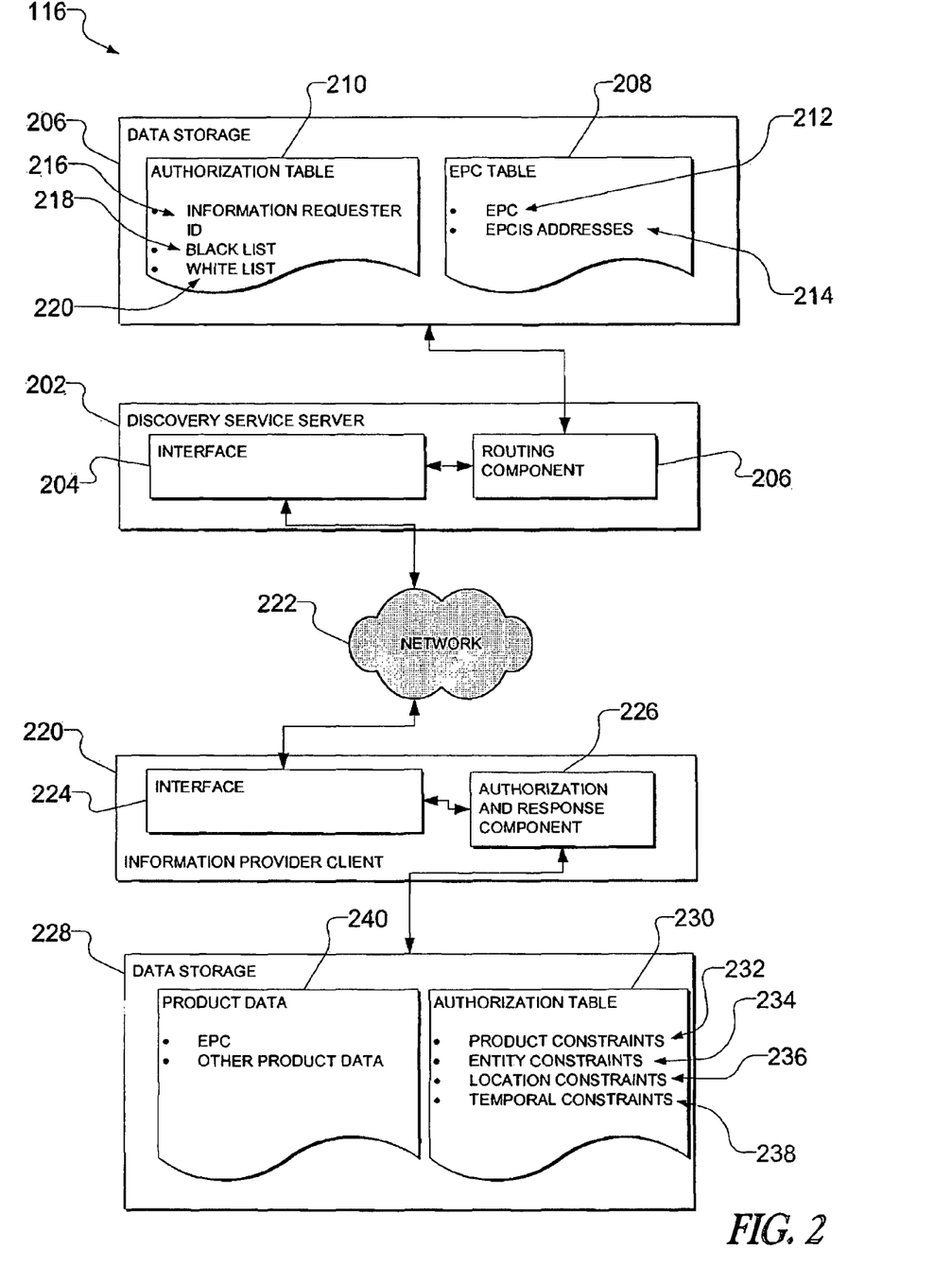
FIG. 2 is a block diagram providing further architectural details regarding a discovery service server, an information provider client, and related data structures, according to an example embodiment.

FIG. 2 is a block diagram showing further architectural details of components 200 that may be deployed in order to support a discovery service within an electronic data environment, according to an example embodiment. While the components 200 are described as being implemented using a client-server architecture, it will be appreciated that other architectures (e.g., a peer-to-peer or distributed architecture) may also be deployed.

Within an electronic data environment, a discovery service may be supported by a discovery service server 202 that includes an interface 204 that operatively receives queries transmitted from an information requester 104, and that also operatively forwards queries to one or more information providers 106, 108. The discovery service server 202 may further include a routing component 206, which is communicatively coupled to the interface 204. The routing component 206 operates to route a query, received from an information requester 104, to one or more information providers 106, 108 using address information associated with such information service providers. To this end, the routing component 206 is communicatively coupled to a discovery service data storage 208 so as to enable the routing component 206 to access and retrieve information stored within the data storage 206. The data storage 206 includes, in the example embodiment, a database (e.g., a relational database) within which are maintained an information-information service provider table, in the form of an EPC table 208 and an authorization table 210. The EPC table 208 stores records for each of a number of EPCs 212, as well as the addresses 214 of EPCISs that are registered providers of data regarding a specific EPC. Accordingly, a single EPC may be associated with multiple EPCIS addresses within the table 208.

The authorization table 210 includes an information requester identifier 216 which, in one example embodiment may correspond to a particular EPCIS address or may be some other identifier uniquely identifying a particular information requester 104. Associated with each information requester identifier 216 may be a blacklist 218 and/or a white list 220, each identifying one or more information providers. Specifically, the blacklist 218 will identify information providers to which queries from the requester 216 should not be forwarded and the white list 220 may identify information providers to which queries from the requester 216 should be forwarded. The black and/or white lists 218, 220 may identify information providers in any one of a number of ways (e.g., using a Uniform Resource Identifier (URI), whose general syntax is defined in RFC2396).

The routing component 206 operates to parse a query received at the discovery service server 202 and extract a product identifier (e.g., EPC) therefrom. The product identifier is then utilized to perform a lookup on the EPC table 208 to locate the addresses of one or more EPCIS recorded within the table 208 as providers of data pertaining to the relevant EPC.

The routing component 206 also operatively uses the EPCIS address of the information requester 104 to perform an access authorization operation, utilizing the authorization table 210. Specifically, for a specific EPCIS, a lookup is performed on the authorization table 210 using the EPCIS address of the information requester 104 to determine whether any of the identified information providers are included in either a blacklist 208 or a white list 220 for the relevant EPCIS. The routing component 206 may then selectively forward the received query to an information provider client 220 assuming that the information requester 104 has authorized the relevant EPCIS.

Each information provider may operate an information provider client 220 (e.g., an EPCIS client) which, as show in FIG. 2, includes an interface 224 for communications with the discovery service server 202 and/or other information provider clients. In various example embodiments, the interface may be an HTTP, HTTPS, SOAP, AS2 or XSD interface. Further, the information provider client may include any number of interfaces for facilitating interactions using the abovementioned interface types.

The information provider client 220 further includes an authorization and response component 226, which is responsible for selectively responding directly to an information requester 104, in accordance with access right data of the information service. In an example embodiment, access right data may be stored locally by an information provider in a data storage 228, to which the authorization and response component 226 is communicatively coupled. In one embodiment, the access right data may be embodied in an authorization table 230, which stores product constraints 232, entity constraints 234, location constraints 236 and temporal constraints 238. These constraints may be retrieved and assessed by the authorization and response component 226 in performing a selective response to a particular query received from a specific information requester for specific product information. In various embodiments, the authorization and response component 226 may respond to a query by transmitting a response to the information requester 104, such transmission bypassing the discovery service server 220. Further, the authorization and response component 226 may respond to a query by granting direct access to specific product data 240, such direct access being provided to the information requester 104 in a manner that bypasses the discovery service server 202.

Figure 3:
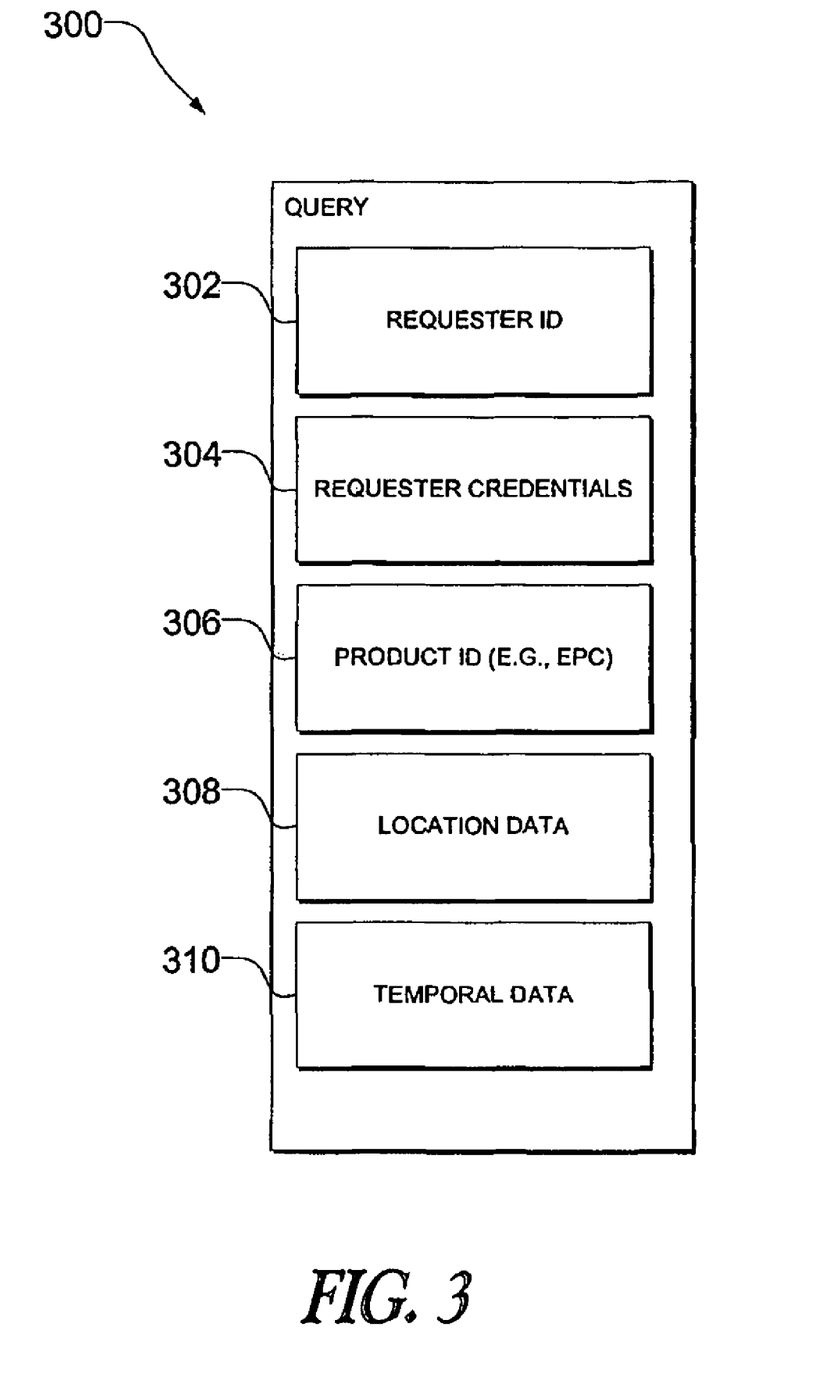
FIG. 3 is a block diagram illustrating the structure of a data environment query, which may be issued by an information requester to a discovery service, according to an example embodiment.

FIG. 3 is a block diagram illustrating contents of a query 300, according to an example embodiment, that may be generated by an information requester 104, transmitted to the discovery service 102, and then selectively forwarded to one or more information providers 106, 108. The query 300 is shown to include a requester identifier 302 (e.g. a URI, URL, or URN) uniquely identifying the information requester 302. The query 300 may also include user credentials 304, which include additional information that may be utilized by an information provider client 220 in performing the above described authorization and response activities. Credentials 304 may include, for example, details of previous contacts or existing business relationships between the information requester 104 and one or more of the information providers. Further, in one example embodiment, a central registry may be provided wherein participants within the environment 100 may register, subject to a vetting and verification process. Registration information for the information requester 104 may also be included within the user credentials 304.

The query 300 may also include a product identifier 306, in the example form of an EPC or other product data. The EPC may be represented in any number of ways (e.g., as URI, URL, URN or XML representations).

Additionally, the query 300 may include location data 308 that may be utilized by the information provider client 220 (e.g., an EPCIS client) to identify location-specific data to be included in the response. For example, an information requester 104 may require information on products, identified by an EPC, available from a particular information provider (e.g., an information supplier 106) within a certain geographic location identified by the location data.

Further, the query 300 may include a temporal data 310, which may constitute a temporal constraint specified by the query. For example, a particular information requester (e.g., a purchaser) may query an EPCglobal Network to determine whether any products, identified by an EPC, have been shipped within a determinable time period (e.g., the last week) from any of the information providers 106, 108 (e.g., product suppliers).

Further, it will be appreciated that the query 308 may contain any one of a number of further types of constraint data to be assessed by an information provider client 220 (e.g., an EPCIS client).

In one specific embodiment, the query 300 may be constructed by an EPCIS client, operated by the information requestor 104. It will further be appreciated that a single entity may operate as both an information requester 104 and an information provider 106 within the context of a particular electronic data network. Accordingly, in an example embodiment, an EPCIS client may operate as both the information provider client 220 as described above with reference to FIG. 3 and an information requester client (not shown) that constructs the query 300.

Figure 4:
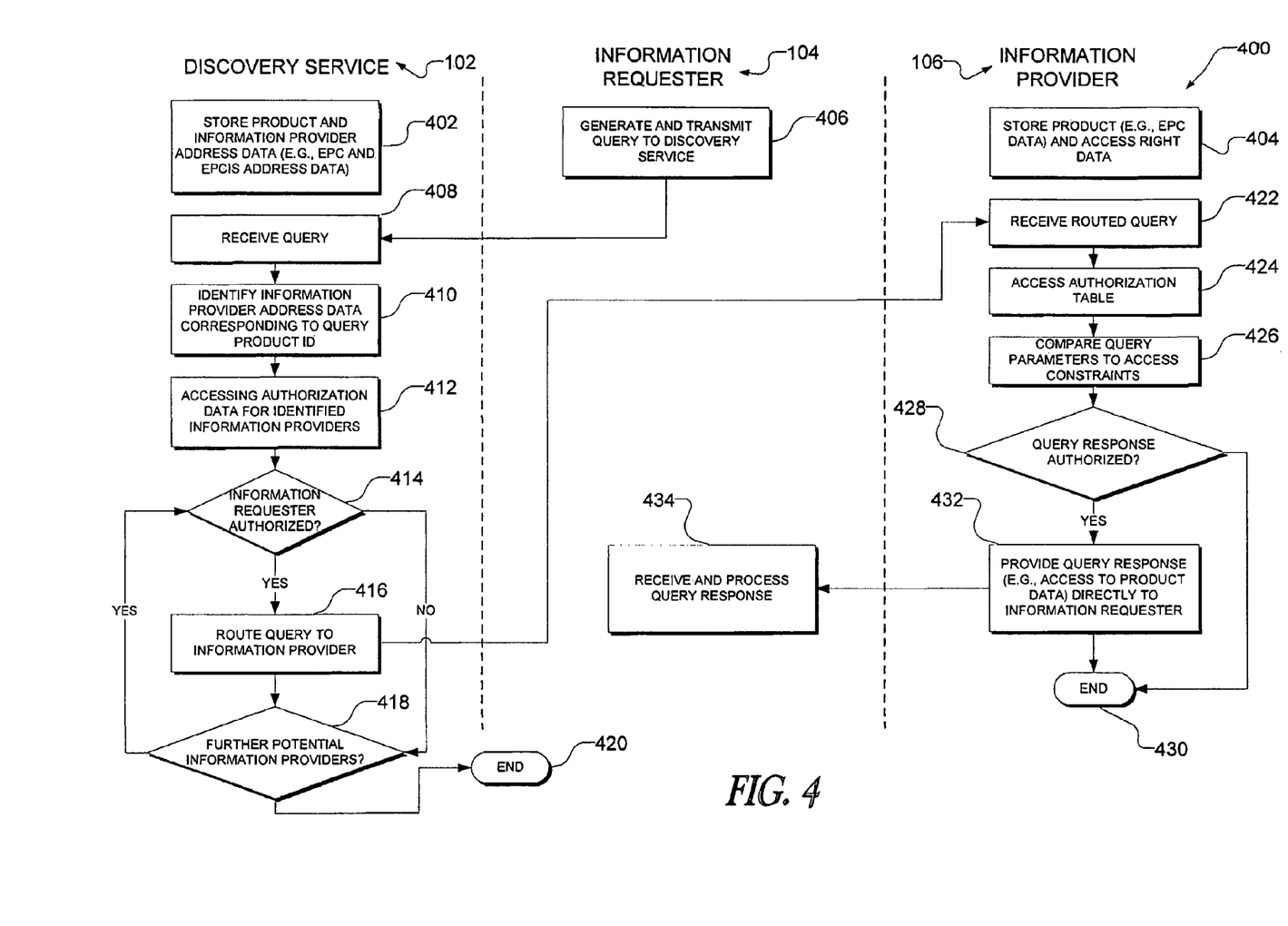
FIG. 4 is a swim lane flowchart illustrating a method, according to an example embodiment, to process and respond to a query directly from an information requester to an information provider within a data environment, according to an example embodiment.

FIG. 4 is a swim lane flowchart illustrating a method 400, according to an example embodiment, to generate, process and respond to a data query within an electronic data system. The method 400 may be performed by processing logic that may comprise hardware (e.g., dedicated logic, programmable logic), firmware (e.g., microcode, etc.), software (e.g., algorithmic or relational programs run on a general purpose computer system or a dedicated machine), or a combination of the above. It will be noted, that, in an example embodiment, the processing logic may reside in any of the modules described herein. Again, the example method 400 will be discussed below within the context of an EPCglobal Network environment, as an example of an electronic data environment, merely for the purposes of illustration.

At operation 402, product and information provider address data is stored at the discovery service 102. In one example embodiment, the product data may comprise EPC data and the information provider address data may comprise EPCIS address data, which are stored within the EPC table 208 of the data storage 206 associated with the discovery service 102. In an example embodiment, information providers 106, 108 may register with the discovery service 102 by transmitting a collection of EPCs, in association with their respective EPCIS address data, to the discovery service server 202. The routing component 206 may then use this information to build the EPC table 208. The EPCISs may, in one embodiment, publish the EPC and EPCIS address information to the discovery service. In another embodiment, the discovery service may poll multiple connected EPCIS for the EPC and EPCIS address information.

At operation 404, an information provider 106, 108 stores product data and access right data. An example embodiment, an information provider client 220, in the example form of an EPCIS client, may store product data (e.g., EPC numbers and associated product information) within a product table 204, and access right data as authorization data within an authorization table 230. The tables 240 and 230 may be stored within a data storage 228 associated with and accessible by the EPCIS client. It will be noted that the product data and access route data for a particular information provider is accessible to a respective information provider client 220 to the exclusion of the discovery service, and duplication of the access right data and/or product data to, for example, a discovery service server 220 may be disabled. In this way, the above described disadvantages associated with duplication of this data between a storage location associated with an information client (e.g., an EPCIS client) and a discovery service are addressed.

At operation 406, an information requester 104, and specifically an EPCIS client of the information provider, may be used to generate and transmit an EPCglobal Network query (e.g., including the information identified above as being included in the query 300) to a discovery service 102.

At operation 408, an interface 204 of a discovery service server 202 receives the query 300 via the network 222, and communicates the query to a routing component 206. At operation 410, the routing component 206 parses the received query 300 to extract an information requester identifier 302 and a product identifier 306 (e.g., an EPC from within the query). Using the extracted product identifier, the routing component performs a lookup on the EPC table 208 to identify information provider address data (e.g., EPCIS addresses) corresponding to the extracted product identifier.

At operation 412, the routing component 206 then performs a lookup, utilizing the EPCIS addresses of the requester identifier 302, and performs a determination, at decision block 414, as to whether the EPCIS address of an identified potential information provider 106, 108 is authorized for the relevant information requester 104. Again, the authorization data may be embodied within a blacklist 218 or a white list 220, as described above with reference to FIG. 2. For each of the identified and authorized potential information providers identified at operation 410 and authorized at operation 414, the routing component 206 will then forward the query 300 to the qualified information provider 108 at operation 416. Having routed the query 300 to a specific information provider 106, the routing component 206, at determination operation 418, determines whether any other potential information providers need to be evaluated. If not, the operations performed by the discovery service 102 terminate at operation 420. On the other hand, if further potential information providers need to be evaluated, the discovery service 102 returns to perform the determination operation 414 with respect to such further potential information providers.

At operation 422, the information provider client 220 (e.g., EPCIS client) of an information provider 106 receives the query 300, as routed by the discovery service 102 from the information requester 104. Specifically, the interface 224 of the information provider client 220 may receive the routed query via the network 222, and communicate the query 300 to the authorization and response component 226.

At operation 424, the authorization and response component 226 parses the query 300 to retrieve the query parameters (e.g., the parameters 302-310 discussed above with reference to FIG. 3), and then accesses right data, in the form of an authorization table 230, for the purposes of performing a data access right assessment.

At operation 426, the authorization and response component 226 then compares the extracted query parameters against access constraints retrieved from the authorization table (e.g., the constraints 232-238).

At decision block 428, it is determined whether a query response is authorized (or at least partially authorized). In the event that a query response is not authorized in terms of the access constraints (e.g., product constraints prevent the information provider 106 from providing product data to the information requester 104), the operations performed by the information provider 106 terminate at operation 430. On the other hand, should a query response be authorized, at operation 432, the authorization and response component 226, via the interface 224, will provide a query response directly to the information requester 104, bypassing the discovery service 102. In one embodiment, the provision of a query response may include the transmission of data (e.g., product data corresponding to an EPC included in the query 300) to the information requester 104. Further, the provision of the query response may include providing the information requester 104 with an authorization to access product data 240 stored within the data storage 228. Again, the authorization to access product data 240, or the provision of the product data 240, is performed directly between the information provider 106 and the information requester 104. The information requester 104 then receives and processes the query response at operation 434.

In conclusion, it will be appreciated that the above described examples may be regarded as being "light weight" in that they avoid heavy data duplication, and data is published within the discovery service only for the purposes of routing. No data is returned by the discovery service 102 to an information requester 104, and complete access to information of an information provider 106 may be controlled directly and locally at an information provider (e.g., using an EPCIS.) While the storage of access and/or product data at the discovery service 110 is not specifically excluded, there is no requirement to do so in order to implement the example embodiment.

Considering confidentiality, the implementation of white and/or blacklists 218, 220 for an information requester 104 provides the information requester 104 with a degree of control as to which entities receive a query originating from the information requester 104. It will be appreciated that a query, in all or itself, may embody confidential information, and accordingly the provision of requester authorization information (e.g., an authorization table 210) within the discovery service may serve to provide an information requester with a degree of control regarding the routing of queries.

Turning now to the issue of scalability of the described embodiment, product and access right data are, in the example embodiment, maintained at the EPCIS level. Accordingly, modifications to access rights are in the hands of the relevant participants, and may be directly implemented. In addition, in view of the lack of duplication of the access right information between, for example, an EPCIS and a discovery service, the implementation of changes to access rights may be conveniently performed.

It will also be appreciated that the above described example embodiment enables a query to reach all relevant information providers 106, 108 that participate in an electronic data environment 100, regardless of whether the information requester 104 is aware of the identity or existence of a respective information provider. Thus, considering again a supply chain example, besides known partners, companies that are unknown to a particular company are also provided with the opportunity to provide information to an information requester. Further, considering an example deployment in which the data environment 100 is a supply chain network, such networks today are becoming increasingly complex and may have a large number of participants. In such an environment, collaboration may be increasingly valuable in addressing problems, such as incorrect ordering and deliveries, low level shop availability, inventory inaccuracies etc. For example, a manufacturer may benefit from knowing the current stock at a retailer's site, product movement from a retailer's storage area to the shop floor indicates that there may soon be a need for a further supply and hence, the manufacturer may be able to plan production accordingly. Conversely, a retailer may find value in analyzing a downstream supply chain, possibly a manufacturer's site, to know from where it can best order products, or simply check the status of a shipment. A discovery service, an example of which is described above, may operate to automate interaction and increase visibility into a supply chain. However, to take advantage of such a network, companies may need to exchange operational data. Depending on the industry, such data may comprise detailed planning and location information, delivery, order of batch number, advance shipping notice, expiry date, arrival date, purchase date, physical dimensions or weight, sensorial information such as temperature etc. Although the exchange of such data may increase collaboration, certain companies may be reluctant to engage in such a collaboration in view of the sensitivity of such operational data. Accordingly, strong security may make collaboration within such a supply chain network more attractive to companies. By enabling the distributed storage and direct control over access data (e.g., the authorization table 230) by potential information providers, anxiety regarding participating in a supply chain network may be somewhat reduced for certain companies. Furthermore, by deploying an authorization table 210, as part of a discovery service, information requesters can be provided with a mechanism whereby confidential information embodied in their queries may be safeguarded from publication to, for example, competitor companies or other undesirable recipients.

Figure 5:
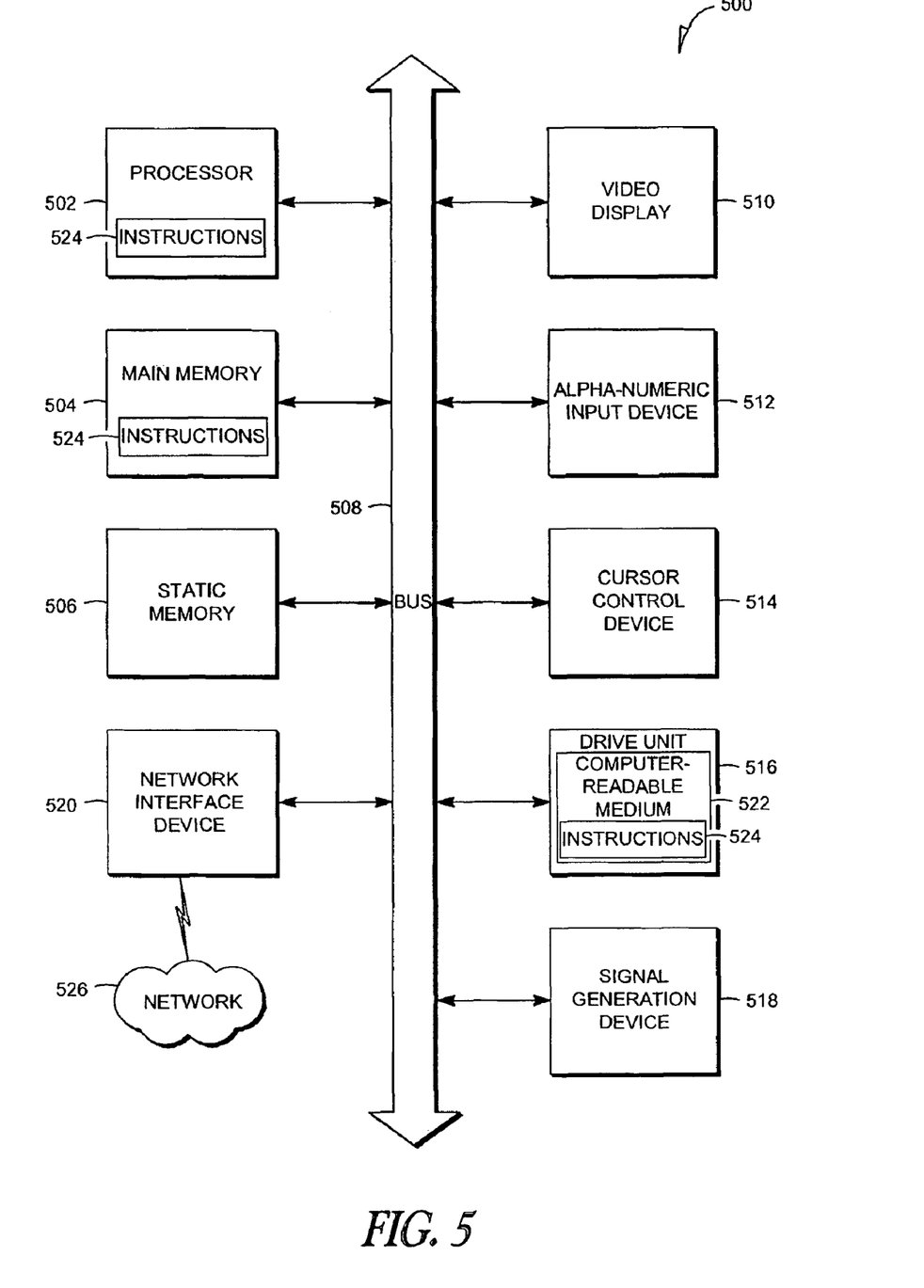
FIG. 5 is a block diagram of machine in the example form of a computer system within which a set of instructions, for causing the machine to perform any one or more of the methodologies discussed herein, may be executed.

FIG. 5 is a block diagram of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP) and embodied as a transmission medium (e.g., a corner wave signal).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media. Example embodiments may be implemented in digital electronic circuitry, or in computer hardware, firmware, software, or in combinations of them. Example embodiments may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers.

Instructions constituting a computer program can be written in any form of programming language, including compiled or interpreted languages, and may be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

Example embodiments may be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of components, modules or mechanisms. A component, module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   storing, at a discovery service, address information for each of a plurality of information services providers;
   storing, at each of the plurality of information services providers,
      product data of a respective information provider; and
      access right data defining access rights to the product data;
   receiving, at the discovery service, a query from an information requester, to locate and access specific product data for a product identifier included in the query;
   identifying, using one or more processors, a first information service, of the plurality of information services providers, as an information provider of the specific product data, and retrieving first address information for the first information service;
   routing the query from the discovery service to the first information service using the first address information, the discovery service being separate from the first information service; and
   at the first information service, selectively responding directly to the information requester in accordance with the access right data of the first information service.

2. The method of claim 1, wherein the responding directly to the information requester includes transmitting a response to the information requester from the first information service that bypasses the discovery service.

3. The method of claim 1, including, at the first information service, selectively granting the information requester direct access to the specific product data in accordance with the access right data.

4. The method of claim 3, wherein the selective granting of the direct access includes providing access to the information requester that bypasses the discovery service.

5. The method of claim 1, including storing access right data exclusively at the respective plurality of information services, and disabling duplication of the access right data from each of the respective plurality of information services to the discovery service.

6. The method of claim 1, wherein the address information for each of the plurality of information services is a network address at which the respective information service is accessible.

7. The method of claim 1, including, at the discovery service, identifying the first information service and a second information service of a plurality of information services as being potential information providers responsive the query, the identification of the first and second information services being based on the product identifier included in the query.

8. The method of claim 1, wherein the query from the information requester includes at least one of requester identification information, requester credentials, product identification information, location data specifying a location constraint, or temporal data specifying a temporal constraint.

9. The method of claim 1, wherein the access right data specifies at least one of product, entity, location or temporal constraints with respective to access to the product data.

10. The method of claim 1, wherein the routing of the query includes, at the discovery service, accessing authorization data of the information requester and selectively forwarding the query to the first information service based on the authorization data, wherein the authorization data at least authorizes or restricts forwarding of queries from the information requester to one of the plurality of information providers.

11. The method of claim 1, wherein the information requester and the plurality of information providers form part of a common supply chain.

12. A system comprising:
   a discovery service data storage to store address information for each of a plurality of information services;

a first information service data storage, associated with a first information service of the plurality of information services, to store:
product data; and
access right data defining access rights to the product data;
an interface to receive, at the discovery service, a query from an information requester, the query pertaining to specific product data for a product identifier included in the query;
a routing component to:
identify, using one or more processors, the first information service as an information provider of the specific product data,
retrieve first address information for the first information service, and
route the query from the discovery service to the first information service using the first address information, the discover service being separate from the first information service; and
a response component, at the first information service, selectively to respond directly to the information requester in accordance with the access right data.

13. The system of claim 12, wherein the response component is to transmit a response to the information requester that bypasses the discovery service.

14. The system of claim 12, wherein the response component is to selectively grant the information requester direct access to the specific product data in accordance with the access right data, the direct access bypassing the discovery service.

15. The system of claim 12, wherein the routing component is to identify the first information service and a second information service of a plurality of information services as being potential information providers responsive the query, the identification of the first and second information services being based on the product identifier included in the query.

16. The system of claim 12, wherein the routing component is to access authorization data of the information requester and selectively to forward the query to the first information service based on the authorization data, wherein the authorization data at least authorizes or restricts forwarding of queries to one of the plurality of information providers.

17. A non-transitory machine-readable medium embodying instructions that, when executed by a machine, caused the machine to perform a method comprising:
storing, at a discovery service, address information for each of a plurality of information services providers;
storing, at each of the plurality of information services providers,
product data of a respective information provider; and
access right data defining access rights to the product data;
receiving, at the discovery service, a query from an information requester, to locate and access specific product data for a product identifier included in the query;
identifying first information service, of the plurality of information services providers, as an information provider of the specific product data, and retrieving first address information for the first information service;
routing the query from the discovery service to the first information service using the first address information, the discovery service being separate from the first information service; and at the first information service, selectively responding directly to the information requester in accordance with the access right data of the first information service.

18. A method comprising:
storing address information, at a discovery service, for each of a plurality of information services providers;
receiving a query from an information requester to locate and access specific product data for a product identifier included in the query;
identifying, using one or more processors, at least one information service, of the plurality of information services, as an information provider of the specific product data, and retrieving address information for the at least one information service; and
routing the query from the discovery service to the at least one information service using the address information, the at least one information service to selectively respond directly to the information requester in accordance with access right data of the at least one information service, the discovery service being separate from the at least one information service.

19. A system comprising:
a discovery service data storage of a discovery service to store address information for each of a plurality of information services;
an interface to receive a query from an information requester, the query pertaining to specific product data for a product identifier included in the query; and
a routing component to:
identify, using one or more processors, at least one information service as an information provider of the specific product data,
retrieve address information for the at least one information service, and
route the query from the discovery service to the at least one information service using the address information, the discovery service being separate from the at least one information service.

* * * * *